Oct. 26, 1937.  A. A. GAY  2,097,321
APPARATUS FOR GENERATING ELECTRIC CURRENT
Filed Oct. 6, 1934
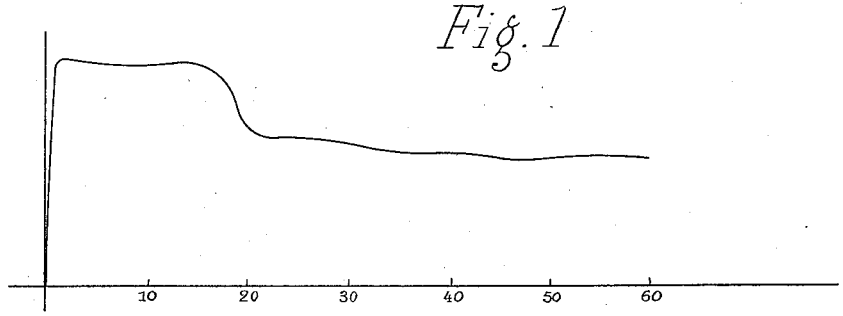
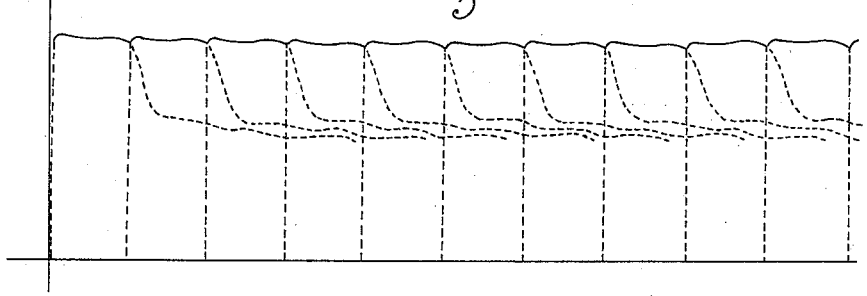
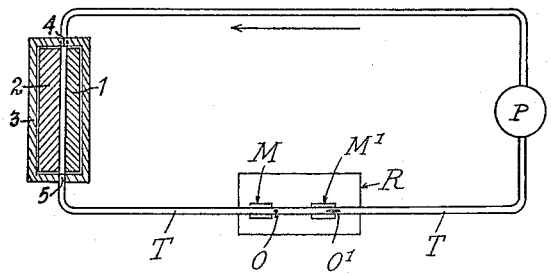
Alphonse Armand Gay
INVENTOR
By Otto Munk
his ATTY.

Patented Oct. 26, 1937

2,097,321

UNITED STATES PATENT OFFICE 2,097,321

APPARATUS FOR GENERATING ELECTRIC CURRENT

Alphonse Armand Gay, Alger, Algeria

Application October 6, 1934, Serial No. 747,204
In Germany October 7, 1933

2 Claims. (Cl. 136—160)

It is known that electric motors are particularly adapted to accommodate easily to variations of loads and to operate in a noiseless and regular manner. The electric motors avoid the drawbacks of combustion or explosion engines, produce but little warmth, are not subjected to violent vibrations, are of a simple construction and reduce the interruptions of service to a minimum. Moreover, they do not consume gasoline or other fuel, the source of which, that is petroleum, has a tendency to become exhausted.

The electric motors however did not prevail over the combustion or explosion engines, particularly for the propulsion of motor vehicles, aeroplanes, etc., on account of the fact that combustion or explosion engines are accompanied by their source of energy contained in a receptacle, whilst electric motors must be connected either to a stationary power plant requiring an important network of electric conductors, or to a heavy and cumbersome storage electric battery or secondary battery, in which the electric energy is stored in a chemical form. Whilst a receptacle may be filled with liquid fuel in a few minutes, the charging of a storage electric battery requires nearly as much time as its discharging, and consequently an electric motor supplied by a storage battery may be used only during half as much time as a combustion or explosion engine, since the other half period must be used for charging again the storage battery.

By the present invention, means are provided for supplying electric motors with electric current produced by primary batteries.

In the accompanying drawing:

Fig. 1 is a diagram showing how the current intensity of a primary cell varies during the first seconds after its starting.

Fig. 2 is a diagram showing how it is possible to maintain a constant current intensity by renewing constantly the primary cell.

Fig. 3 shows diagrammatically an arrangement for renewing the electrolyte of a primary cell.

The primary batteries have not been used for supplying electric energy for the propulsion of motor vehicles, aeroplanes, etc., on account of the fact that the electric current due to the chemical action produced in the primary batteries is weak and not constant. It is known however that at the outset of the chemical action, when the substances are brought into contact with each other, the intensity of the current is nearly twice as great as the normal current; this high value of the current lasts during a few seconds and then decreases suddenly to the normal value of the current. The ordinates of the diagram of Figure 1 show the variations of said current, whilst the abscissae represent the time in seconds. It is thus apparent that a primary cell may produce a current equal to, and even greater than the current of a secondary cell, the periods of time of said currents only being different.

If we assume that, as soon as the current of a primary cell decreases suddenly as shown in Fig. 1, a new primary cell is immediately inserted in the electric circuit and produces a new current in said circuit, it will then be possible to use in said circuit a series of successive currents represented on the diagram of Fig. 2 resulting in a practically constant current having a great intensity and represented by the full lines of said diagram. This result may be obtained by renewing constantly the chemical elements of the primary cell, so as to have always a new primary cell in operation, and it may be sufficient for this purpose to renew constantly the electrolyte. An apparatus of this type adapted to be used for generating current must be able to operate as follows:

(a) It must produce a great current during a few seconds (for example 10 seconds);

(b) The electrolyte which has just been working must be eliminated and replaced by a supply of new electrolyte;

(c) The two above conditions must be obtained in only one element, in order to avoid a great space requirement.

In Figure 3 is shown diagrammatically an embodiment of the invention. If it is assumed that the period of great current lasts ten seconds, it is necessary that the electrolyte which is present between the anode 1 and the cathode 2 of the electric cell 3 be completely renewed during these ten seconds. It is thus sufficient for this purpose that the pump P circulates during ten seconds a volume of electrolyte exactly equal to the volume contained between anode 1 and cathode 2 and consequently that during ten seconds a quantity of electrolyte equal to said volume enters the cell 3 through the inlet 4 and a same quantity of electrolyte passes through the outlet 5 into the tube T. Due to this circulation of the electrolyte, not only is a great intensity of current assured, but the constancy of said intensity is also assured. Since the pump circulates constantly new liquid, the primary cell is always as if it were new, and the intensity of current remains always at its maximum value, so much the more that the rapid circulation keeps the electrodes perfectly clean while preventing gaseous bubbles or creeping salts from adhering to said electrodes.

It is obvious that every type of primary cell may be used for the production of current. It will be necessary to determine very exactly for each type of primary cell the duration of the current of high intensity when the chemical substances have been brought into contact. The output of the pump must be calculated according to said duration, and the importance of the cell and the surface of its electrodes depend upon the intensity of the current. Generally, the output of the pump varies inversely with the duration of said high current.

It is advisable to choose a cell having a minimum internal resistance, a maximum voltage, and as few pieces as possible.

It is particularly advantageous to use primary cells in which the acid liquids and the depolarizers are mixed together, for instance those formed of zinc, potassium bichromate and sulphuric acid. The voltage of such primary cells is as high as that of a secondary cell, that is 2 volts. The intensity of current is very great, since the internal resistance is very low; moreover, such a primary cell is composed only of a plate of zinc facing a plate of carbon, both plates being dipped in only one liquid.

Experience has shown that the electrolyte is rapidly troubled when in operation and that its conductibility is also affected. A small quantity of zinc sulphate is sufficient to eliminate this drawback. As usual, the cathodes are made of amalgamated zinc in the proportion of 95 parts of zinc and 5 parts of mercury. In order to prevent as much as possible the zinc from being uselessly corroded, it is advisable to amalgamate further the zinc on its surface. In order to prevent the excess of mercury from being driven with the circulating liquid, it is advisable to add a mercury salt into the electrolyte. The electrolyte comprises thus preferably sulphuric acid $H_2SO_4$, potassium bichromate $K_2Cr_2O_7$, zinc sulphate $ZnSO_4$ and mercury sulphate $HgSO_4$.

It is to be noted that the electric cell is supplied with electrolyte in a manner analogous to the supply of liquid fuel to combustion or explosion engines. It would be of a great interest if it were possible to reduce to a minimum the volume of the electrolyte corresponding to a given electrical energy, or in other words if it were possible to make a concentrated electrolyte. A solid concentrated electrolyte may be obtained with 3 parts of $H_2SO_4$ and 1 part of $K_2Cr_2O_7$. This is a considerable advantage for the transportation. Before using said solid concentrated electrolyte it will be sufficient to mix said concentrated electrolyte with the exact quantity of water necessary for dissolving the powder constituting the electrolyte; the solution thus obtained may be introduced into the receptacle R. As mentioned above, it will be advantageous to add to said concentrated electrolyte, $1/100$ part of $HgSO_4$ and $1/100$ part of $ZnSO_4$.

If the electrolyte were injected in its concentrated state into the electric cell, the cathode would be too much attacked by said electrolyte. In order to avoid this exaggerated attack, the tube T connecting the electric cell with the pump P passes through the receptacle R containing the concentrated electrolyte. The tube T is provided in the interior of said receptacle with two apertures O and $O^1$. In operation, a small quantity of the liquid circulating in the tube T escapes through one of said apertures and passes into the receptacle R, and a same quantity of concentrated electrolyte is driven through the other aperture from the receptacle R into the tube T due to the known suction effect of hydraulic exhausters. Adjusting members M and $M^1$ may be provided in order to vary the surface of said apertures and consequently to regulate the quantity of concentrated electrolyte introduced into the liquid circulating in the tube T.

The liquid circulating in the tube T and the concentrated electrolyte are mixed thoroughly in the pump P. With such an arrangement, the electric cell is supplied with a liquid having always the same chemical composition and this electric cell is thus constantly as if it were new.

It is obvious that an electric cell may be constructed so as to give any desired intensity of current: it is sufficient to give to the electrodes a suitable area. For the electric cell above mentioned, it is advisable to choose an intensity of current approximating 0.15 ampere per square centimeter of the surface of the cathode. Since the voltage of an electric cell is always the same (2 volts in the above mentioned example), it is necessary to mount a number of cells in series when it is desired to obtain a higher voltage. Each cell shall be provided in this case with its particular pump and with its particular receptacle, in order to avoid short-circuiting through the electrolyte.

The arrangement shown in Fig. 3 is particularly adapted for apparatuses which are intended to be operative during long periods of time without stopping, for instance, in the case of an aeroplane, since the motor is then practically stopped only when the travel is quite done. For motor vehicles, on the contrary, which are intended to be stopped frequently, it is useless that the pumps remain in operation when the vehicle is stopped, since the electrolyte would then be attacked to no purpose. It may be even not sufficient to stop the pumps, for the cathode of the above described example of electric cell is attacked even in open circuit. It is then advantageous to empty the electric cell. It is not advisable however to introduce the liquid of the electric cell, which is suitably acidulated, into the receptacle R containing concentrated electrolyte, in order to avoid a chemical precipitation by mixing the two different liquids. Moreover, when starting again, the pump would draw from the receptacle R and deliver into the electric cell a too concentrated electrolyte.

It is obvious that the invention is not limited to the above described embodiment, which has been chosen merely by way of example. In the appended claims, the expression "initial current" means the current produced by the electric cell during the few seconds following the moment when the chemical agents of the cell have been brought into contact.

Having now described my invention what I claim as new and desire to secure by Letters Patent is:

1. An apparatus for generating electric current comprising a box provided with an outlet and an inlet, in said box a cathode and an anode, a receptacle, a concentrated electrolyte in said receptacle, conduit means between said inlet and said outlet of said box passing through said receptacle, a normal electrolyte contained in said box and in said conduit means and adapted to furnish with said cathode and said anode a relatively high current during an initial short period of a few seconds and afterwards a lower current during a relatively long period, circulating means inserted in said conduit means and adapted to circulate said normal electrolyte in said conduit means and in said box in such manner that the whole of the electrolyte in said box is renewed during each period at the most equal to said initial period, said conduit means being provided in said receptacle with two apertures, whereby normal electrolyte is adapted to pass through one of said apertures from said conduit means into said receptacle and concentrated electrolyte is adapted to pass through the other aperture from said receptacle into said conduit means.

2. An apparatus as claimed in claim 1 comprising further adjusting means for regulating the effective surface of said two apertures.

ALPHONSE ARMAND GAY.